United States Patent
Tanikawa et al.

(10) Patent No.: US 6,687,139 B2
(45) Date of Patent: Feb. 3, 2004

(54) INVERTER CONTROL APPARATUS

(75) Inventors: Makoto Tanikawa, Tokyo (JP); Takahiro Ishigami, Tokyo (JP); Yoshihiko Kikkawa, Tokyo (JP); Hitoshi Tanifuji, Tokyo (JP); Yoshihiro Iwasaki, Tokyo (JP); Hiroaki Suzuki, Tokyo (JP); Isao Kawasaki, Tokyo (JP); Ichiro Minejima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1 day.

(21) Appl. No.: 09/863,314

(22) Filed: May 24, 2001

(65) Prior Publication Data

US 2001/0036093 A1 Nov. 1, 2001

Related U.S. Application Data

(63) Continuation of application No. PCT/JP99/06643, filed on Nov. 29, 1999.

(51) Int. Cl.$^7$ ................................................. H02M 5/45
(52) U.S. Cl. ........................... 363/37; 363/98; 363/132
(58) Field of Search ............................ 363/34, 36, 37, 363/95, 97, 98, 131, 132; 318/768, 801, 803, 806, 808, 810, 811

(56) References Cited

U.S. PATENT DOCUMENTS

| | | | | |
|---|---|---|---|---|
| 5,115,386 A | * | 5/1992 | Shirahama et al. | 307/66 |
| 5,481,451 A | * | 1/1996 | Kuwahara | 363/37 |
| 5,663,627 A | * | 9/1997 | Ogawa | 318/803 |
| 6,011,707 A | * | 1/2000 | Mine | 363/89 |
| 6,028,406 A | * | 2/2000 | Birk | 318/138 |
| 6,396,225 B1 | * | 5/2002 | Wakui et al. | 318/254 |

FOREIGN PATENT DOCUMENTS

| | | |
|---|---|---|
| GB | 2 312 301 | 10/1997 |
| JP | HEI 1-91666 A | 4/1989 |
| JP | HEI 1-144365 A | 6/1989 |
| JP | HEI 3-155391 A | 7/1991 |
| JP | HEI 4-364395 A | 12/1992 |
| JP | HEI 5-33698 U | 4/1993 |
| JP | 6-153534 | 5/1994 |
| WO | WO 98/02959 | 1/1998 |

* cited by examiner

*Primary Examiner*—Adolf D. Berhane
*Assistant Examiner*—Gary L. Laxton
(74) *Attorney, Agent, or Firm*—Oblon, Spivak, McClelland, Maier & Neustadt, P.C.

(57) ABSTRACT

Provided are, a converter section (30) which converts a commercial AC voltage ($V_{AC}$) into a DC voltage ($V_{DC}$); an inverter section (60) which converts the DC voltage ($V_{DC}$) into an output AC voltage ($V_{OUT}$) of a predetermined frequency by a pulse-width modulation system based on an assigned PWM width, and supplies the output AC voltage ($V_{OUT}$) to a compressor motor (70). Further, an instantaneous DC voltage detecting section (50) detects an instantaneous DC voltage ($V_{DCS}$); and an arithmetic processing section (100) corrects the PWM width so as to maintain the output AC voltage ($V_{OUT}$) at a desired value following the variation in the instantaneous DC voltage ($V_{DCS}$). It is possible to operate a compressor motor (70) in an optimum state of load characteristics and efficiency.

6 Claims, 9 Drawing Sheets

FIG.2

(A) POWER SOURCE VOLTAGE IN EUROPE     220 TO 240 V±10%
REFERENCE VOLTAGE $V_{ref}$     230×1.414

(B) POWER SOURCE VOLTAGE IN CHINA     220V±10%
REFERENCE VOLTAGE $V_{ref}$     220×1.414

(C) POWER SOURCE VOLTAGE IN AUSTRALIA REFERENCE VOLTAGE $V_{ref}$     240V±10%
240×1.414

FIG.9 (A) PRIOR ART
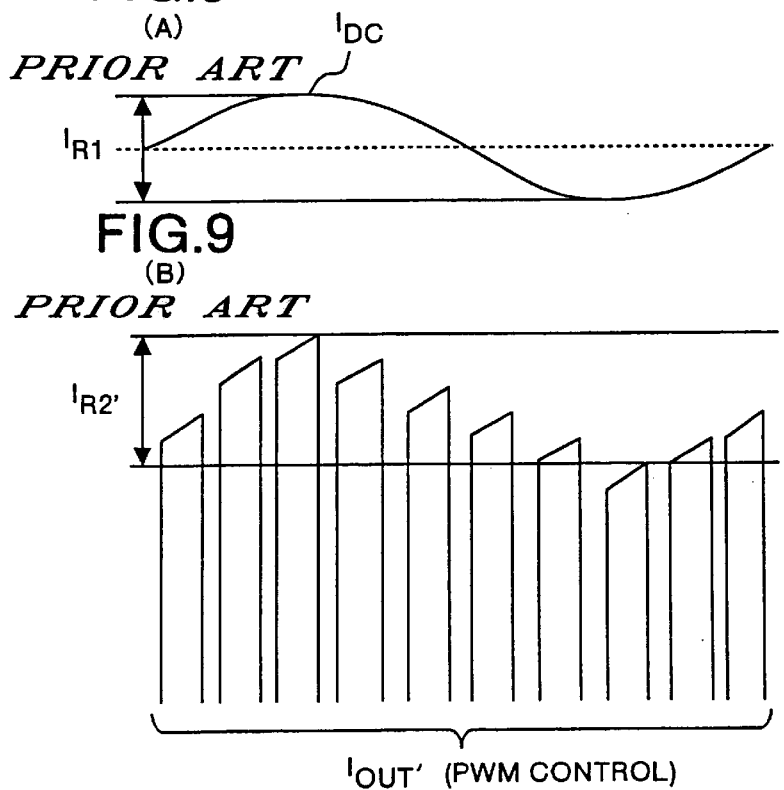
FIG.9 (B) PRIOR ART
FIG.9 (C)
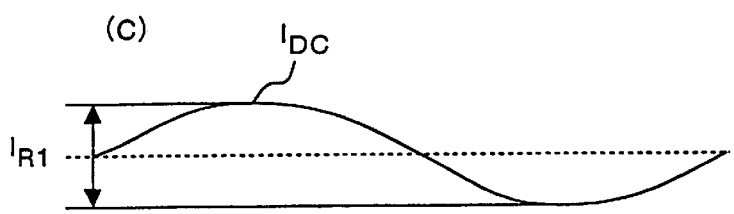
FIG.9 (D)
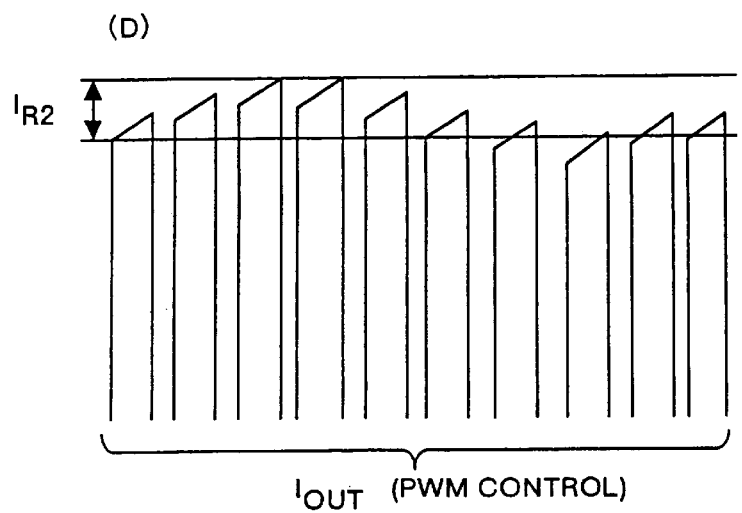

INVERTER CONTROL APPARATUS

This is a continuation of International PCT Application No. PCT/JP99/06643 filed Nov. 29, 1999.

TECHNICAL FIELD

The present invention in general relates to an inverter control apparatus used in air conditioners. More particularly, this invention relates to an inverter control apparatus for controlling a compressor motor.

BACKGROUND ART

The air conditioner comprises an indoor unit (placed inside a house) and an outdoor unit (placed outside the house) Conventionally, in the outdoor unit of the air conditioner, there has been provided an inverter control apparatus for controlling a compressor motor (an induction motor, a DC brushless motor, etc. ) that is driven by an output AC voltage. The output AC voltage is obtained as follows. A converter and a smoothing capacitor once converts a commercial AC voltage into a DC voltage, and the inverter again converts the DC voltage into the output AC voltage by a PWM (Pulse Width Modulation) control.

The conventional converter is provided with a diode bridge circuit, and this converter converts a commercial AC voltage into a DC voltage. The smoothing capacitor is connected in parallel to the converter, and smoothes the DC voltage that has been obtained by the conversion of the converter. The inverter is composed of a switching element like a witching transistor. This inverter is a three-phase inverter that converts the DC voltage into an output AC voltage of a three-phase AC having a predetermined frequency by the PWM control for ON/OFF controlling the switching element at a predetermined timing. This inverter is input with a PWM switching pattern for instructing a switching timing of the switching element.

This PWM switching pattern is generated based on a target voltage corresponding to the operation frequency of the compressor motor by a known V/F (Voltage/Frequency) control. The operation frequency takes a value according to an air-conditioning load. For example, the operation frequency takes a large value when there is a large difference between a set temperature of the air conditioner and a room temperature.

The output AC voltage from the inverter is expressed as a surface area (i.e. surface area S) that is a product of a DC voltage $V_{DC}$ and a PWM width W as shown in FIG. 7. In the PWM control, the PWM width W is controlled so that the output AC voltage coincides with the target voltage. The DC voltage $V_{DC}$ shown in this drawing is a DC voltage that has been smoothed by the smoothing capacitor, and the PWM width W corresponds to a period during which the switching element of the inverter is ON.

When the commercial AC voltage is supplied to the converter, the converter full-wave rectifies this commercial AC voltage to convert this voltage into the DC voltage. Then, the smoothing capacitor smoothes this DC voltage, and supplies the smoothed DC voltage to the inverter.

In this case, the PWM width W is calculated from the DC voltage $V_{DC}$ and the target voltage (i.e. the surface area S) shown in FIG. 7. In other words, the PWM width W is a result of dividing the target voltage by the DC voltage $V_{DC}$. In this calculation of the PWM width W, the DC voltage $V_{DC}$ is handled as a constant value. A PWM switching pattern corresponding to the PWM width W is input to the inverter.

Based on the above arrangement, the inverter ON/OFF controls the switching element at a predetermined timing according to the PWM switching pattern, thereby to convert the DC voltage into the output AC voltage having a predetermined PWM width. This output AC voltage is supplied to the compressor motor so that the compressor motor is driven.

As mentioned above, in the conventional inverter control apparatus, the DC voltage $V_{DC}$ is handled as a constant value for calculating the PWM width shown in FIG. 7. However, in reality, the commercial AC voltage varies, therefore, the DC voltage $V_{DC}$ also varies.

Therefore, according to the conventional inverter control apparatus, there arises a difference between the PWM width W calculated and a theoretical value for carrying out an optimum control, when the DC voltage $V_{DC}$ has varied. In other words, the PWM width is calculated as a constant value regardless of a variation in the DC voltage $V_{DC}$ shown in FIG. 7 following the variation in the commercial AC voltage. As a result, there arises a situation that the output AC voltage (corresponding to the area S) actually supplied from the inverter to the compressor motor cannot follow the target voltage.

FIGS. 8(A) and (B) show a case where an output AC voltage $V_{OUT}'$ from the inverter varies following the variation in the DC voltage $V_{DC}$. FIG. 8(A) shows a state that although it is desirable that the DC voltage $V_{DC}$ takes a constant value, the DC voltage $V_{DC}$ increases along lapse of time and then decreases, due to the influence of the variation in the commercial AC voltage. When the DC voltage $V_{DC}$ has varied like this, an output AC average voltage $VA_{OUT}'$ that is a time-averaged output AC voltage $V_{OUT}'$ also varies as shown in FIG. 8(B).

As explained above, according to the conventional inverter control apparatus, the PWM width W is calculated based on the DC voltage $V_{DC}$ as a constant value, despite the fact that the $V_{DC}$ varies every moment from a DC voltage $V_{DC1}$ to a DC voltage $V_{DC2}$, ..., and to a DC voltage $V_{DC5}$, as shown in the drawing. Therefore, surface areas $S_1$ to $S_5$ of output AC voltage elements $V_1'$ to $V_5'$ also take different values respectively.

As a result, the conventional inverter control apparatus has had the following problem. When the DC voltage $V_{DC}$ has varied following the variation in the commercial AC voltage, the output AC voltage $V_{OUT}'$ that is supplied from the inverter to the compressor motor is deviated from the target voltage. As a result, it has not been possible to carry out an optimum operation of the compressor motor.

Particularly, when the commercial AC voltage has decreased suddenly, the output AC voltage $V_{OUT}'$ becomes less than a minimum rated voltage of the compressor motor, which is a voltage shortage state. This results in an occurrence of a stalling. On the other hand, when the commercial AC voltage has increased suddenly, the output AC voltage $V_{OUT}'$ exceeds a maximum rated voltage of the compressor motor, which is an overvoltage state. This results in a flow of an excess current to operate the protection circuit, and stops the operation of the compressor motor (a stop due to an overcurrent).

The power source situations (rated values, and stability, etc. of a commercial AC voltage,) in the world are different between the countries (regions). Therefore, in countries where the stability of the commercial AC voltage is low, the use of the conventional inverter control apparatus can easily invite the occurrence of the above-described voltage shortage and overvoltage. Therefore, the risk of a frequent occurrence of the stalling and a stop due to an overcurrent becomes very high. In other words, according to the conventional inverter control apparatus, there has been a problem that the stability of the control of the compressor motor is easily controlled by the power source situation.

A DC current $I_{DC}$ shown in FIG. 9(A) includes a ripple IR1, as the inverter control apparatus uses a low-cost circuit for reducing the cost of. This DC current $I_{DC}$ is a voltage that has been smoothed by the smoothing capacitor. The size of the ripple $I_{R1}$ is determined by a circuit constant and the load.

According to the conventional inverter control apparatus, the DC current $I_{DC}$ that includes the ripple $I_{R1}$ shown in FIG. 9(A) is switched by the PWM control. Therefore, an output AC current $I_{OUT}'$ from the inverter shown in FIG. 9(B) also includes a ripple $I_{R2}'$. A peak value of this ripple $I_{R2}'$ corresponds to a peak value of the ripple $I_{R1}$ (reference FIG. 9(A).

From the above, the conventional inverter control apparatus has had also the following problems. It is necessary to use an overcurrent protection circuit that breaks a DC when the DC flowing through the switching element of the inverter exceeds a threshold value, and to use a switching element that has a large capacity and high precision. This has been expensive.

It is an object of the present invention to provide an inverter control apparatus capable of operating an AC load at low cost and in an optimum state, and also capable of operating the AC load in an optimum state under any power source situation.

DISCLOSURE OF THE INVENTION

The inverter control apparatus according to this invention comprises a converting unit which converts a commercial AC voltage into a DC voltage; an inverting unit which converts the DC voltage into an output AC voltage of a predetermined frequency by a pulse-width modulation system based on an assigned pulse width, and supplies the output AC voltage to an AC load; an instantaneous DC voltage detecting unit which detects an instantaneous value of the DC voltage; and a correcting unit which corrects the pulse width so as to maintain the output AC voltage at a desired value following the variation in a result of a detection by the instantaneous DC voltage detecting unit.

Thus, in the inverter control apparatus of this invention, the instantaneous value of a DC voltage also varies following the variation in a commercial AC voltage. This variation in the instantaneous value of the DC voltage is also reflected in a result of a detection carried out by an instantaneous DC voltage detecting unit. Then, the correcting unit corrects the pulse width following the variation in the detection result. As a result, the output AC voltage supplied from the inverting unit to the AC load is maintained at a desired value without receiving an influence of the variation in the instantaneous value of the DC voltage following the variation in the commercial AC voltage.

In other words, it is possible to supply an output AC voltage of a desired value to the AC load without receiving an influence of the variation in the commercial AC voltage. As a result, it is possible to operate the AC load in an optimum state of load characteristics and efficiency.

Further, it is preferable that the correcting unit corrects the pulse width based on a result of multiplying a ratio of a preset reference voltage to a detection result of the instantaneous DC voltage detecting unit, and a target voltage as a target value of the output AC voltage.

Thus, the correcting unit corrects the pulse width based on a result of multiplying a ratio of a reference voltage to a detection result of the instantaneous DC voltage detecting unit, and a target voltage. Therefore, it is possible to supply an output AC voltage of a desired value to the AC load without receiving an influence of the variation in the commercial AC voltage. As a result, it is possible to operate the AC load in an optimum state of load characteristics and efficiency.

Further, the inverter control apparatus may further comprise a setting changing unit which changes a setting of the reference voltage according to the commercial AC voltage.

Thus, the setting changing unit changes the setting of the reference voltage according to the commercial AC voltage. Therefore, it is possible to supply an output AC voltage of a desired value to the AC load in countries and regions where the power source situations (rated values, and stability, etc. of a commercial AC voltage,) are different. As a result, it is possible to operate the AC load in an optimum state regardless of countries and regions.

Further, it is preferable that the correcting unit corrects the pulse width by calculating the ratio for every one period of a modulation carrier in the pulse-width modulation system.

Thus, the pulse width is corrected for everyone period of a modulation carrier. Therefore, as the influence of the ripple included in the commercial AC voltage is reduced, it is possible to avoid a current breaking due to an overcurrent attributable to the ripple, and it is also possible to increase the reliability. Further, it is possible to lower the cost (an overcurrent breaking circuit) for avoiding the ripple.

Further, it is preferable that the correcting unit corrects the pulse width by calculating the ratio for every n periods (=equal to or above 2) of a modulation carrier in the pulse-width modulation system.

Thus, the ratio (a reference voltage/a detection result of the instantaneous DC voltage detecting unit) is calculated for every n periods of a modulation carrier. Therefore, it is possible to decrease the number of calculating the ratio per unit time, as compared with the case of calculating the ratio for every one period. As a result, it is possible to lower the cost as the correction can be realized by a low-cost arithmetic and logic unit.

Further, it is preferable that the instantaneous DC voltage detecting unit directly detects the DC voltage by a non-insulating circuit that has been grounded to be in a potential common to that of the correcting unit.

Accordingly, it is possible to shorten the detection time, as compared with the case of detecting a DC voltage using an insulating circuit like a photo-coupler or the like.

BRIEF DESCRIPTION OF THE DRAWINGS

FIG. 2 is a diagram showing a power source voltage and a reference voltage $V_{ref}$ in Europe, China and Australia respectively;

FIGS. 9(A–D) are diagrams for explaining problems of the conventional inverter control apparatus and effects of the first embodiment.

BEST MODE FOR CARRYING OUT THE INVENTION

Preferred embodiments of this invention will be explained in detail below with reference to the accompanying drawings.

Figure 1:
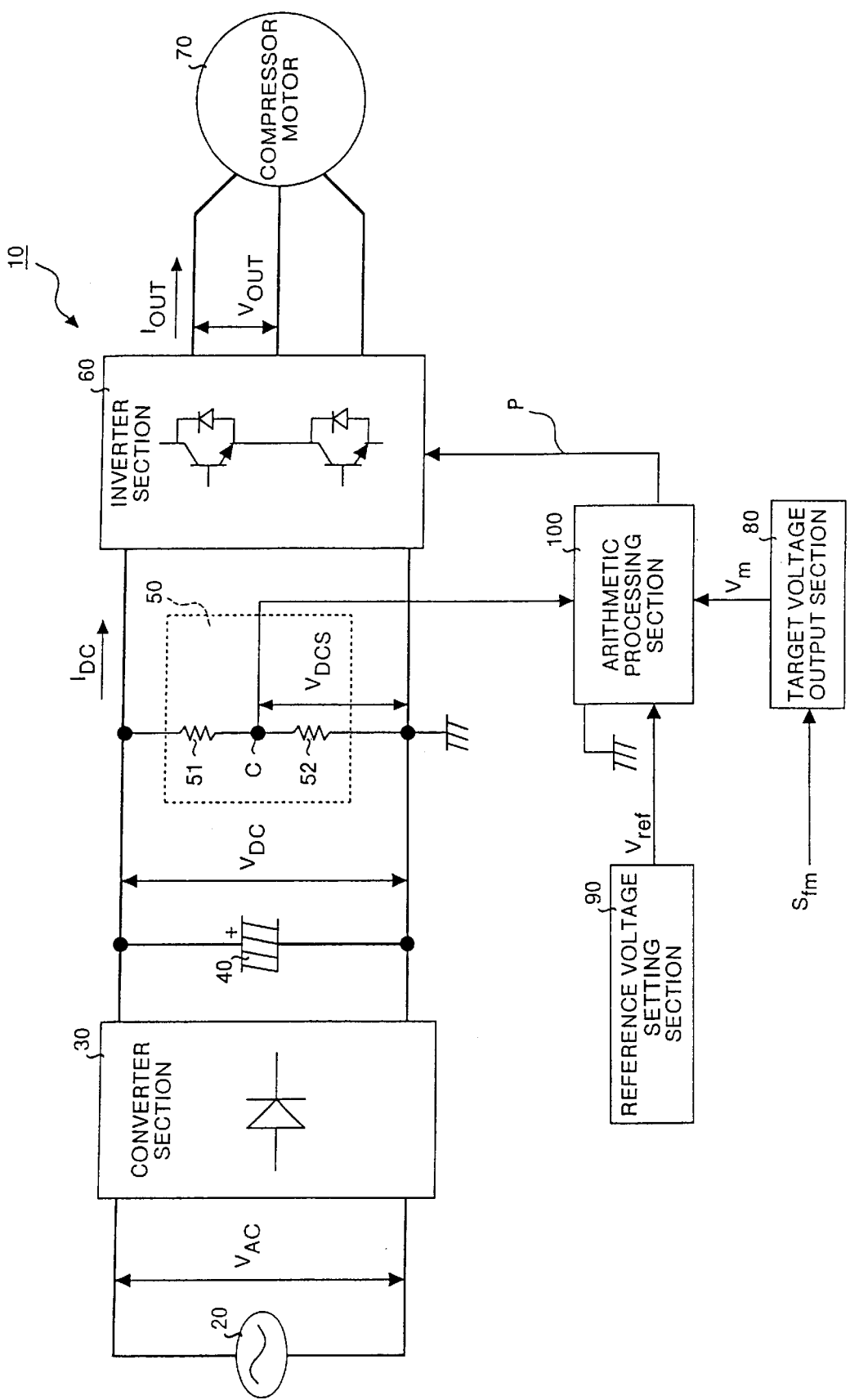
FIG. 1 is a block diagram showing a structure of a first embodiment relating to the present invention.

FIG. 1 is a block diagram showing a structure of a first embodiment relating to the present invention. The inverter control apparatus 10 shown in this figure is provided in the outdoor unit of the air conditioner. The inverter control apparatus 10 is for converting a commercial AC voltage $V_{AC}$ into a DC voltage $V_{DC}$, and then inversely converting this DC voltage $V_{DC}$ into an output AC voltage $V_{OUT}$ of a desired three-phase AC, thereby to control a compressor motor 70.

In this inverter control apparatus 10, a commercial AC power source 20 supplies the commercial AC voltage $V_{AC}$ to a converter section 30. The commercial AC voltage $V_{AC}$ supplied from the commercial AC power source 20 is different depending on the country in the world because of differences in the power source situations, and the laws relating to power supply business between the countries.

For example, in Europe, the commercial AC voltage $V_{AC}$ is within the range from 220 to 240 V±10% as described in the column of "Power source voltage in Europe" as shown in FIG. 2(A). In China, the commercial AC voltage $V_{AC}$ is within the range of 220 V±10% as described in the column of "Power source voltage in China" as shown in FIG. 2(B). Further, in Australia, the commercial AC voltage $V_{AC}$ is within the range of 240 V±10% as described in the column of "Power source voltage in Australia" as shown in FIG. 2(C).

Referring back to FIG. 1, the converter section 30 is composed of a diode bridge circuit connected in parallel to the commercial AC power source 20, to convert the commercial AC voltage $V_{AC}$ into the DC voltage. A smoothing capacitor 40 is connected in parallel to the converter section 30, to smooth the DC voltage obtained by conversion by the converter section 30. An inter-terminal voltage of the smoothing capacitor 40 is a DC voltage $V_{DC}$ after the smoothing. This DC voltage $V_{DC}$ varies by receiving the influence of the variation in the commercial AC power source 20.

An instantaneous DC voltage detecting section 50 is connected in parallel to the smoothing capacitor 40, and is composed of a voltage-dividing resistor 51 and a voltage-dividing resistor 52 that are connected in series. This instantaneous DC voltage detecting section 50 detects an instantaneous value of the DC voltage $V_{DC}$ as a divided instantaneous DC voltage $V_{DCS}$. In other words, the instantaneous DC voltage $V_{DCS}$ is a voltage between the ground and a connection point C between the voltage-dividing resistor 51 and the voltage-dividing resistor 52. This voltage has a size (equal to or above 0 V and less than 5 V) that can be directly processed by an A/D (Analog/Digital) conversion port (not shown) of an arithmetic processing section 100 to be described later. In the following explanation, the DC voltage $V_{DC}$ and the instantaneous DC voltage $V_{DCS}$ will be explained to have the same value, for the sake of the convenience of the explanation.

An inverter section 60 has a switching element like a power transistor, an IPM (Intelligent Power Module), and the like. This is a three-phase inverter that converts a DC voltage $V_{DC}$ into an output AC voltage $V_{OUT}$ of a three-phase AC having a predetermined frequency by a PWM control for ON/OFF controlling the switching element at a predetermined timing.

The IPM accommodates the switching element, a driving circuit, a protection circuit, etc. in one module. This is means for systematizing the power device and for making the power device intelligent. The compressor motor 70 is provided in the outdoor unit (not shown) of the air conditioner, and is driven by the three-phase output AC voltage $V_{OUT}$ supplied from the inverter section 60. An induction motor, a DC brushless motor, etc. are used as the compressor motor 70.

A target voltage output section 80 outputs a target voltage $V_m$ corresponding to an operation frequency $f_m$ obtained from an operation frequency command signal $S_{fm}$ by a known V/F (Voltage/Frequency) control. The operation frequency $f_m$ takes a value according to an air-conditioning load. For example, this value becomes large when there is a large difference between a set temperature of the air conditioner and a room temperature. The operation frequency command signal $S_{fm}$ is a signal corresponding to the operation frequency $f_m$. The target voltage $V_m$ is a voltage that takes an optimum value with respect to the operation frequency $f_m$, and the target voltage $V_m$ is obtained from V/F pattern data shown in FIG. 3.

The target voltage $V_m$ is used for calculating a PWM width W to be described later. The V/F pattern data shown in this drawing shows a relationship between the operation frequency $f_m$ in the horizontal axis and the target voltage $V_m$ in the vertical axis. The V/F pattern data has characteristics capable of most efficiently control the compressor motor 70. This V/F pattern data is stored in a memory (not shown) of the target voltage output section 80.

Referring back to FIG. 1, a reference voltage setting section 90 is for setting the reference voltage $V_{ref}$ to an arithmetic processing section 100. This $V_{ref}$ corresponds to a rated value (=constant) of the commercial AC voltage $V_{AC}$, and takes a value corresponding to the commercial AC voltage $V_{AC}$ (power source situation) in each country (region) of the world. For example, the reference voltage $V_{ref}$ in Europe is 230×1.414 V shown in FIG. 2(A). The reference voltage $V_{ref}$ in China is 220×1.414 V shown in FIG. 2(B). Further, the reference voltage $V_{ref}$ in Australia is 240×1.414 V. As explained above, the reference voltage setting section 90 sets the reference voltage $V_{ref}$ that conforms to the corresponding country according to the commercial AC voltage $V_{AC}$ in each country of the world.

Referring back to FIG. 1, the arithmetic processing section 100 generates a PWM switching pattern signal P based on the target voltage $V_m$ from the target voltage output section 80, and outputs this to the inverter section 60. This PWM switching pattern signal P is for controlling the timing of turning ON/OFF the switching element of the inverter section 60. In other words, this PWM switching pattern signal P is for controlling the PWM width of the output AC voltage $V_{OUT}$.

In actual practice, the arithmetic processing section 100 is not simply generating the PWM switching pattern signal P from the target voltage $V_m$. Instead, the arithmetic processing section 100 corrects the target voltage $V_m$ (a corrected target voltage $V_{ma}$) using a DC voltage correction coefficient A for correcting the variation of the DC voltage $V_{DC}$, and generates the PWM switching pattern signal P from this result.

Specifically, the arithmetic processing section 100 calculates the DC voltage correction coefficient A from the following equation (1), and then calculates the corrected target voltage $V_{ma}$ from the following equation (2).

DC voltage correction coefficient A=Reference voltage $V_{ref}$/Instantaneous DC voltage $V_{DCS}$ (1)

Corrected target voltage $V_{ma}$=Target voltage $V_m$×DC voltage correction coefficient A (2)

The corrected target voltage $V_{ma}$ of the equation (2) is the target voltage $V_m$ that has been corrected based on the variation of the instantaneous DC voltage $V_{DCS}$ (the DC voltage $V_{DC}$). For example, when the commercial AC voltage $V_{AC}$ has become higher than the rated value, the instantaneous DC voltage $V_{DCS}$ (the DC voltage $V_{DC}$) becomes higher than the reference voltage $V_{ref}$. In this case, the DC voltage correction coefficient A becomes less than 1, so that the corrected target voltage $V_{ma}$ becomes less than the target voltage $V_m$. In other words, when the instantaneous DC voltage $V_{DCS}$ has become higher than the reference voltage $V_{ref}$, the corrected target voltage $V_{ma}$ is set to have a lower value than the target voltage $V_m$.

On the other hand, when the commercial AC voltage $V_{AC}$ has become lower than the rated value, the instantaneous DC voltage $V_{DCS}$ (the DC voltage $V_{DC}$) becomes lower than the reference voltage $V_{ref}$. In this case, the DC voltage correction coefficient A becomes larger than 1, so that the corrected target voltage $V_{ma}$ becomes higher than the target voltage $V_m$. In other words, when the instantaneous DC voltage $V_{DCS}$ has become lower than the reference voltage $V_{ref}$, the corrected target voltage $V_{ma}$ is set to have a higher value than the target voltage $V_m$.

Further, when the commercial AC voltage $V_{AC}$ has become equal to the rated value, the instantaneous DC voltage $V_{DCS}$ (the DC voltage $V_{DC}$) takes the same value as the reference voltage $V_{ref}$. In this case, the DC voltage correction coefficient A becomes 1, so that the corrected target voltage $V_{ma}$ becomes equal to the target voltage $V_m$.

After the arithmetic processing section 100 has divided the corrected target voltage $V_{ma}$ by the instantaneous DC voltage $V_{DCS}$ and obtained the PWM width from this result, the arithmetic processing section 100 generates the PWM switching pattern signal P corresponding to this PWM width, and outputs this signal to the inverter section 60. The arithmetic processing section 100 is also grounded to take the same potential as that of one end portion of the voltage-dividing resistor 52.

Next, the operation of the first embodiment will be explained with reference to a flowchart shown in FIG. 5. First, the reference voltage setting section 90 shown in FIG. 1 sets to the arithmetic processing section 100 the reference voltage $V_{ref}$ that conforms to the power source situation (the commercial AC voltage) of the country (region) in which the air conditioner is used.

For example, when the air conditioner is to be used in Europe, the reference voltage setting section 90 sets 230× 1.1414 V shown in FIG. 2(A) as the reference voltage $V_{ref}$. When the air conditioner is to be used in China, the reference voltage setting section 90 sets 220×1.1414 V shown in FIG. 2(B) as the reference voltage $V_{ref}$. Further, when the air conditioner is to be used in Australia, the reference voltage setting section 90 sets 240×1.1414 V as the reference voltage $V_{ref}$.

When the commercial AC voltage $V_{AC}$ has been supplied to the converter section 30 from the commercial AC power source 20, the converter section 30 full-wave rectifies this commercial AC voltage $V_{AC}$. Then, the smoothing capacitor 40 smoothes this commercial AC voltage, and converts it into the DC voltage $V_{DC}$. In this case, the voltage-dividing resistor 51 and the voltage-dividing resistor 52 of the instantaneous DC voltage detecting section 50 divide the DC voltage $V_{DC}$, so that the instantaneous DC voltage $V_{DCS}$ between the connection point C and the ground is detected. This instantaneous DC voltage $V_{DCS}$ is input to an A/D conversion port (not shown) of the arithmetic processing section 100.

Figure 3:
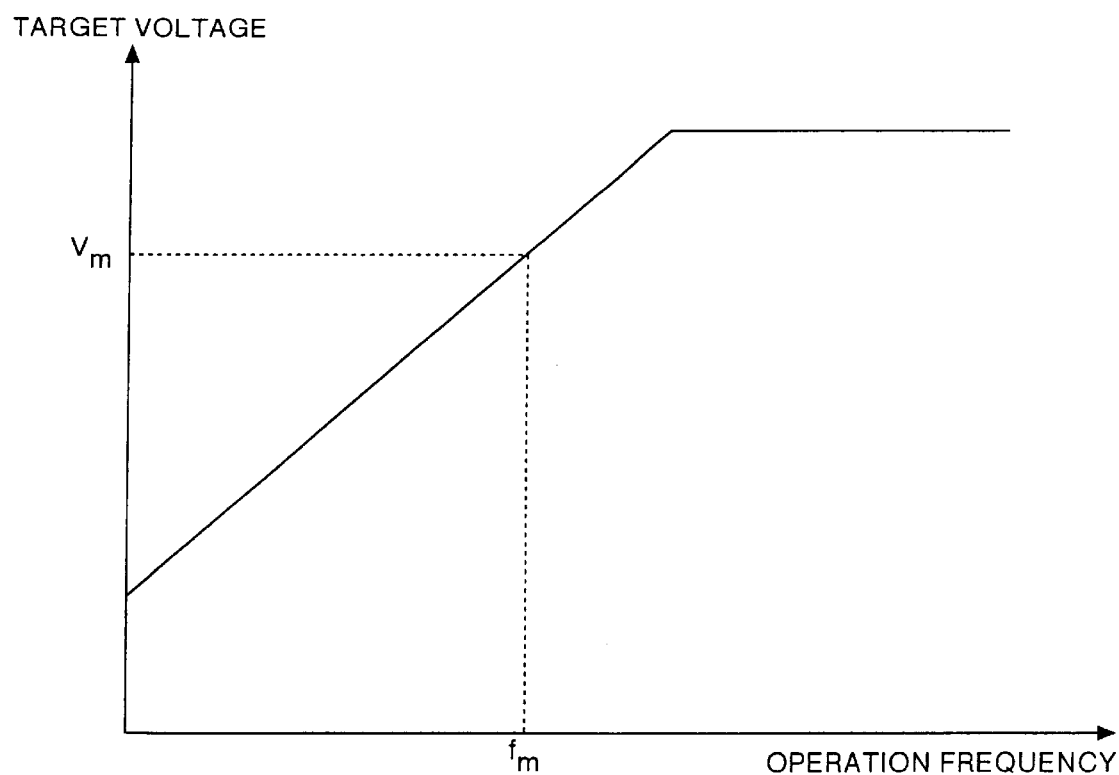
FIG. 3 is a diagram showing a V/F pattern data.
Figure 4:
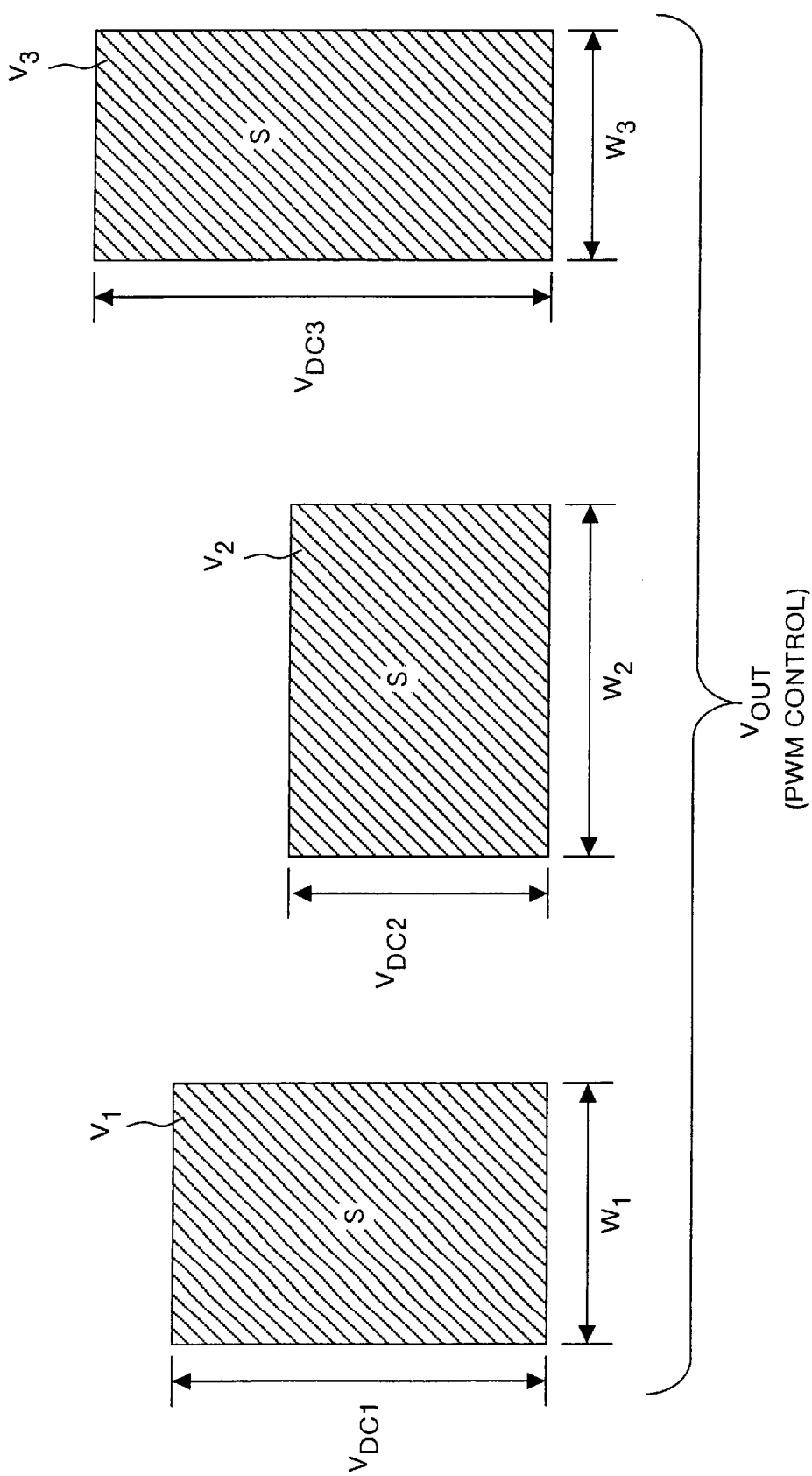
FIG. 4 is a diagram showing a waveform of an output AC voltage $V_{OUT}$ shown in FIG. 1.

When the operation frequency command signal $S_{fm}$ corresponding to the operation frequency $f_m$ of the compressor motor 7 has been input to the target voltage output section 80, the target voltage output section 80 obtains the target voltage $V_m$ corresponding to the operation frequency $f_m$ from the V/F pattern data shown in FIG. 3, and then outputs this target voltage $V_m$ to the arithmetic processing section 100.

Figure 5:
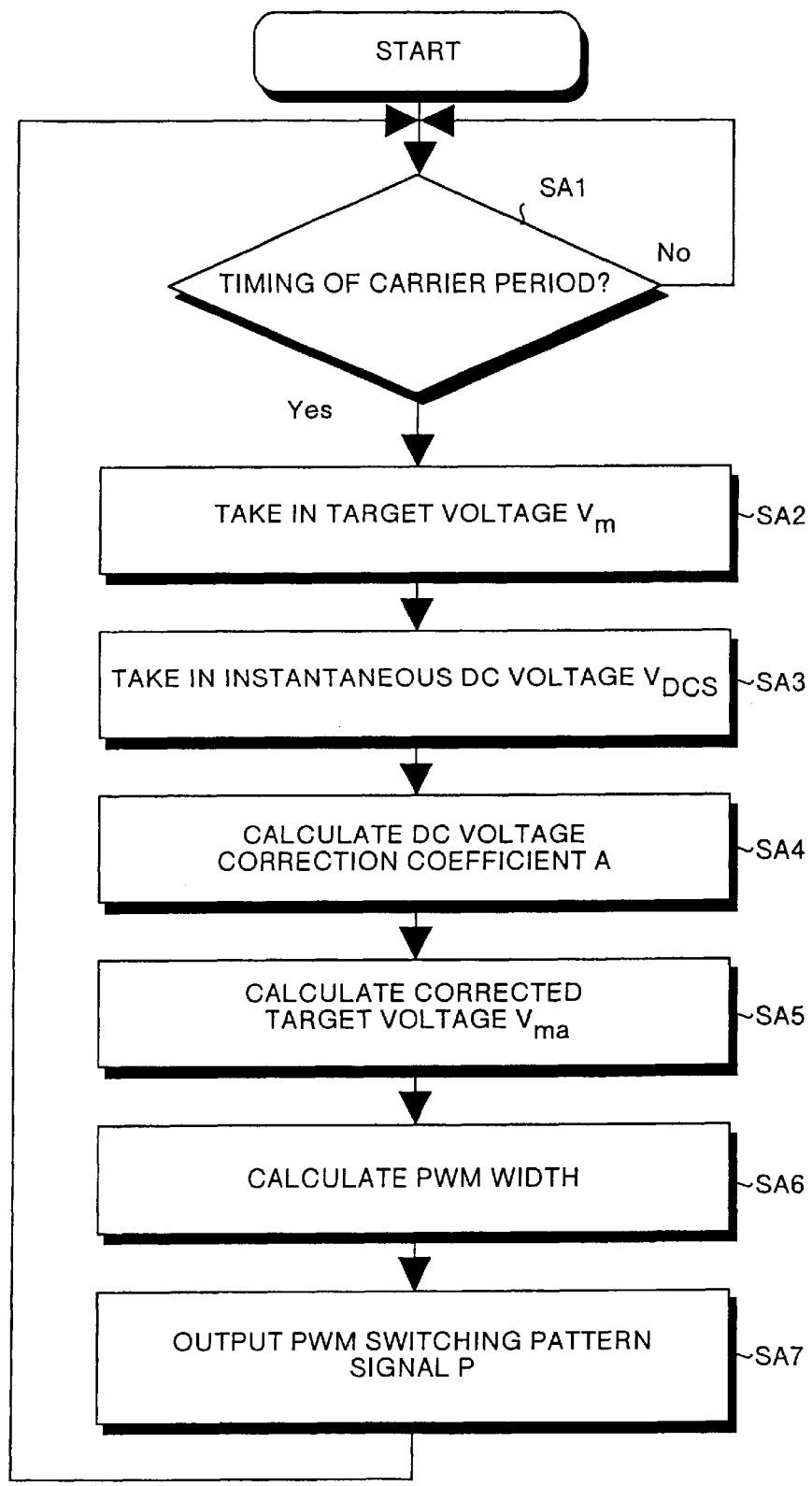
FIG. 5 is a flowchart for explaining the operation of the first embodiment.

The arithmetic processing section 100 then proceeds to step SA1 shown in FIG. 5, and makes a decision as to whether the timing of a carrier period has come or not based on a result of the time measured by a timer (not shown). In this case, the arithmetic processing section 100 sets "No" as a result of the decision made, and then repeats making the same decision. This carrier period is a period of the carrier (a modulated wave) in the PWM control of the inverter section 60.

When the timing of the carrier period has come, the arithmetic processing section 100 sets "Yes" as a result of the decision made at step SA1, and then proceeds to step SA2. At step SA2, the arithmetic processing section 100 takes in the target voltage $V_m$ from the target voltage output section 80, and then proceeds to step SA3. It is assumed that the target voltage $V_m$ takes a constant value. At step SA3, the arithmetic processing section 100 directly takes in the instantaneous DC voltage $V_{DCS}$ from the instantaneous DC voltage detecting section 50 via the A/D conversion port (not shown), and then proceeds to step SA4.

At step SA4, the arithmetic processing section 100 substitutes the reference voltage $V_{ref}$ from the reference voltage setting section 90 and the instantaneous DC voltage $V_{DCS}$ taken in at step SA3, into the equation (1), and calculates the DC voltage correction coefficient A. Then, the arithmetic processing section 100 proceeds to step SA5.

Figure 8:
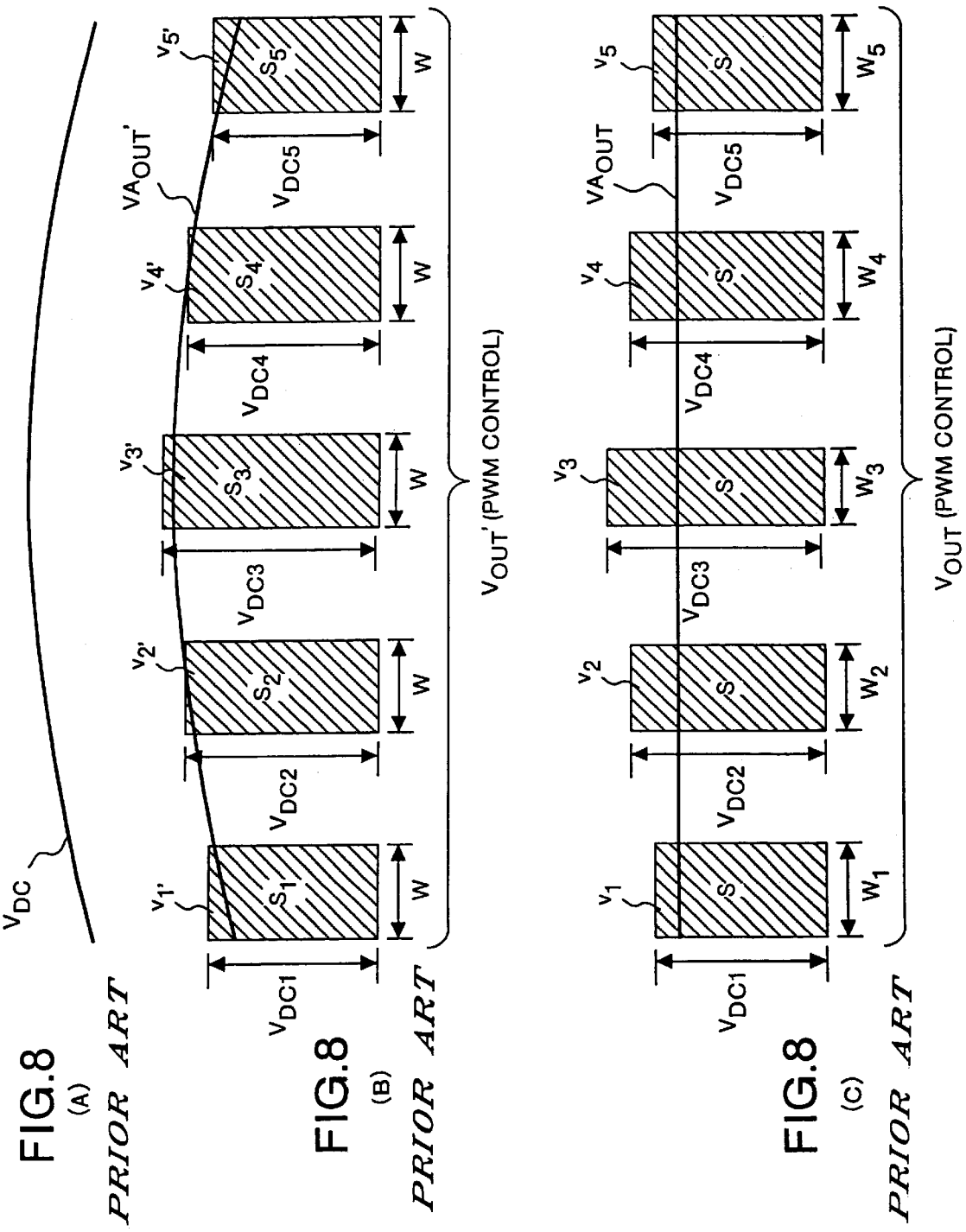
FIGS. 8(A–C) are diagrams for explaining problems of the conventional inverter control apparatus and effects of the first embodiment.

In this case, it is assumed that the commercial AC voltage $V_{AC}$ takes a rated value, and that the DC voltage $V_{DC}$ is the DC voltage $V_{DC1}$ (=the reference voltage $V_{ref}$) shown in FIG. 8(C). Then, the instantaneous DC voltage $V_{DCS}$ (=the DC voltage $V_{DC1}$) becomes equal to the reference voltage $V_{ref}$. As a result, the DC voltage correction coefficient A (the reference voltage $V_{ref}$/the instantaneous DC voltage $V_{DCS}$) becomes 1.

At step SA5, the arithmetic processing section 100 substitutes the target voltage $V_m$ taken in at step SA2 and the DC voltage correction coefficient A (=1) calculated at step SA4, into the equation (2), thereby to calculate the corrected target voltage $V_{ma}$, and then proceeds to step SA6. In this case, as the DC voltage correction coefficient A is 1, the corrected target voltage $V_{ma}$ becomes equal to the target voltage $V_m$.

At step SA6, the arithmetic processing section 100 divides the corrected target voltage $V_{ma}$ by the instantaneous DC voltage $V_{DCS}$ (=the DC voltage $V_{DC1}$: reference FIG. 8(C)) taken in at step SA3, and obtains a PWM width $W_1$ shown in FIG. 8(C), as a result of this division. Then, the arithmetic processing section 100 proceeds to step SA7. At step SA7, the arithmetic processing section 100 generates the PWM switching pattern signal P corresponding to the PWM width $W_1$. Next, the arithmetic processing section 100 outputs the PWM switching pattern signal P to the inverter section 60, and returns to step SA1. Then, the arithmetic processing section 100 repeats making the above decision.

When the PWM switching pattern signal P has been input to the inverter section 60, the inverter section 60 converts the DC voltage $V_{DC}$ (=the DC voltage $V_{DC1}$: reference FIG. 8(C)) into the output AC voltage $V_{OUT}$, by the PWM control of turning ON/OFF the switching element according to the PWM switching pattern signal P. The inverter section 60 supplies this output AC voltage $V_{OUT}$ to the compressor motor 70. In this case, the PWM width $W_1$ of an output AC voltage element $v_1$ in the output AC voltage $V_{OUT}$ is the PWM width that has been calculated at step SA6, as shown in FIG. 8(C).

When the timing of the carrier period has come, the arithmetic processing section 100 sets "Yes" as a result of the decision made at step SA1, and then proceeds to step SA2. At step SA2, the arithmetic processing section 100 takes in the target voltage $V_m$ from the target voltage output section 80, and then proceeds to step SA3. At step SA3, the arithmetic processing section 100 takes in the instantaneous DC voltage $V_{DCS}$ from the instantaneous DC voltage detecting section 50, and then proceeds to step SA4. In this case, it is assumed that the DC voltage $V_{DC}$ has increased from the DC voltage $V_{DC1}$ shown in FIG. 8(C) to the DC voltage $V_{DC2}$, due to the increase in the commercial AC voltage $V_{AC}$.

At step SA4, the arithmetic processing section 100 substitutes the reference voltage $V_{ref}$ from the reference voltage setting section 90 and the instantaneous DC voltage $V_{DCS}$ (=the DC voltage $V_{DC2}$) taken in at step SA3, into the equation (1), and calculates the DC voltage correction coefficient A. Then, the arithmetic processing section 100 proceeds to step SA5.

In this case, it is assumed that the commercial AC voltage $V_{AC}$ takes a higher value than the rated value, and that the DC voltage $V_{DC}$ is the DC voltage $V_{DC2}$ (>the reference voltage $V_{ref}$) shown in FIG. 8(C). As a result, the DC voltage correction coefficient A (the reference voltage $V_{ref}$/the instantaneous DC voltage $V_{DCS}$) takes a value less than 1.

At step SA5, the arithmetic processing section 100 substitutes the target voltage $V_m$ taken in at step SA2 and the DC voltage correction coefficient A (<1) calculated at step SA4, into the equation (2), thereby to calculate the corrected target voltage $V_{ma}$, and then proceeds to step SA6. In this case, as the DC voltage correction coefficient A is less than 1, the corrected target voltage $V_{ma}$ becomes less than the target voltage $V_m$.

At step SA6, the arithmetic processing section 100 divides the corrected target voltage $V_{ma}$ by the instantaneous DC voltage $V_{DCS}$ (=the DC voltage $V_{DC2}$: reference FIG. 8(C)) taken in at step SA3, and obtains a PWM width $W_2$ shown in FIG. 8(C), as a result of this division. Then, the arithmetic processing section 100 proceeds to step SA7. This PWM width $W_2$ is smaller than the PWM width $W_1$ that is before the increase of the DC voltage $V_{DC}$.

At step SA7, the arithmetic processing section 100 generates the PWM switching pattern signal P corresponding to the PWM width $W_2$ (<the PWM width $W_1$). Next, the arithmetic processing section 100 outputs the PWM switching pattern signal P to the inverter section 60, and returns to step SA1. Then, the arithmetic processing section 100 repeats making the above decision.

When the PWM switching pattern signal P has been input to the inverter section 60, the inverter section 60 converts the DC voltage $V_{DC}$ (=the DC voltage $V_{DC2}$: reference FIG. 8(C)) into the output AC voltage $V_{OUT}$, by the PWM control of turning ON/OFF the switching element according to the PWM switching pattern signal P. The inverter section 60 supplies this output AC voltage $V_{OUT}$ to the compressor motor 70.

In this case, the PWM width $W_2$ of an output AC voltage element $v_2$ in the output AC voltage $V_{OUT}$ is smaller than the PWM width $W_1$, contrary to the trend that the DC voltage $V_{DC2}$ is higher than the DC voltage $V_{DC1}$. In other words, the PWM width $W_2$ is made smaller than the PWM width $W_1$ so that the area S of the DC voltage element $v_1$ becomes equal to the area S of the DC voltage element $v_2$. As a result, an output AC average voltage $CA_{OUT}$ that is an average value of the output AC voltage $V_{OUT}$ is maintained at a constant value, regardless of the variation in the DC voltage $V_{DC}$ (the DC voltage $V_{DC1}$ to the DC voltage $V_{DC2}$) following the variation in the commercial AC voltage $V_{AC}$.

Thereafter, the above-described operation is repeated for every one-carrier period, at step SA1 to step SA7. Based on this operation, a PWM width $W_3$ to a PWM width $W_5$ are varied according to an increase and a decrease in DC voltages $V_{DC3}$ to $V_{DC5}$ so that all the areas S in output AC voltage elements $v_3$ to $v_5$ become equal, as shown in FIG. 8(C). As a result, an output AC average voltage $VA_{OUT}$ takes a constant value at all time without receiving an influence of the variation in the DC voltage $V_{DC}$ following the variation in the commercial AC voltage $V_{AC}$.

When the DC voltage $V_{DC}$ has decreased from the reference voltage $V_{ref}$ due to a reduction in the commercial AC voltage $V_{AC}$, at step SA4, the arithmetic processing section 100 substitutes the reference voltage $V_{ref}$ from the reference voltage setting section 90 and the instantaneous DC voltage $V_{DCS}$ (<the DC voltage $V_{DC2}$) taken in at step SA3, into the equation (1), and calculates the DC voltage correction coefficient A. Then, the arithmetic processing section 100 proceeds to step SA5. In this case, the DC voltage correction coefficient A takes a value larger than 1.

At step SA5, the arithmetic processing section 100 substitutes the target voltage $V_m$ taken in at step SA2 and the DC voltage correction coefficient A (>1) calculated at step SA4, into the equation (2), thereby to calculate the corrected target voltage $V_{ma}$, and then proceeds to step SA6. In this case, as the DC voltage correction coefficient A takes a value larger than 1, the corrected target voltage $V_{ma}$ becomes higher than the target voltage $V_m$.

At step SA6, the arithmetic processing section 100 divides the corrected target voltage $V_{ma}$ by the instantaneous DC voltage $V_{DCS}$ taken in at step SA3, and obtains a PWM width W, as a result of this division. Then, the arithmetic processing section 100 proceeds to step SA7. This PWM width is larger than the PWM width $W_1$ shown in FIG. 8(C).

At step SA7, the arithmetic processing section 100 generates the PWM switching pattern signal P corresponding to the PWM width (>the PWM width $W_1$). Next, the arithmetic processing section 100 outputs the PWM switching pattern signal P to the inverter section 60, and returns to step SA1. Then, the arithmetic processing section 100 repeats making the above decision.

When the PWM switching pattern signal P has been input to the inverter section 60, the inverter section 60 converts the DC voltage $V_{DC}$ into the output AC voltage $V_{OUT}$, by the PWM control of turning ON/OFF the switching element according to the PWM switching pattern signal P. The inverter section 60 supplies this output AC voltage $V_{OUT}$ to the compressor motor 70. In this case too, the product (surface area) of the DC voltage $V_{DC}$ and the PWM width becomes equal to the area S shown in FIG. 8. As a result, the output AC average voltage $VA_{OUT}$ is maintained at a constant value without receiving an influence of a reduction in the DC voltage $V_{DC}$ following the reduction in the commercial AC voltage $V_{AC}$.

As explained above, according to the first embodiment, the arithmetic processing section 100 corrects the PWM width based on a result (the corrected target voltage $V_{ma}$) of multiplying a ratio (the DC voltage correction coefficient A) of the reference voltage $V_{ref}$ to the instantaneous DC voltage $V_{DCS}$ detected by the instantaneous DC voltage detecting section 50, and the commercial AC voltage $V_m$. Therefore, it is possible to supply the output AC voltage $V_{OUT}$ of a desired value to the compressor motor 70 without receiving an influence of the variation in the commercial AC voltage $V_{AC}$. As a result, it is possible to operate the compressor motor 70 in an optimum state of load characteristics and efficiency.

Further, according to the first embodiment, the reference voltage setting section 90 alters the setting of the reference voltage $V_{ref}$ according to the commercial AC voltage $V_{AC}$. Therefore, it is possible to supply the output AC voltage $V_{OUT}$ of a desired value to the compressor motor 70 in countries and regions where the power source situations (rated values, and stability, etc. of the commercial AC voltage,)are different. As a result, according to the first embodiment, it is possible to avoid the risk of the occurrence of a stalling and a stop of the compressor motor 70 due to an overcurrent attributable to a voltage shortage and an overvoltage.

Further, according to the first embodiment, the PWM width is corrected for every one-carrier period. Therefore, it is also possible to correct the ripple $IR_2$ included in the output AC voltage $I_{OUT}$ as shown in FIGS. 9(C) and (D). Thus, according to the first embodiment, the ripple $IR_2$ (reference FIG. FIG. 9(D)) included in the output AC voltage $I_{OUT}$ is lowered as compared with the conventional ripple $I_{R2}'$ (reference FIG. 9(B)). As a result, it is possible to avoid the current stop due to the overcurrent attributable of the ripple, and to improve the reliability. Further, it is possible to lower the cost for reducing the ripple (the cost of an overcurrent breaking circuit, and a switching element).

Further, according to the first embodiment, the instantaneous DC voltage detecting section 50 as a non-insulating circuit directly inputs the instantaneous DC voltage $V_{DCS}$ to the arithmetic processing section 100 via the A/D conversion port. Therefore, it is possible to shorten the detection time, as compared with the case of detecting a DC voltage by using an insulating circuit like a photo-coupler or the like.

Further, according to the first embodiment, a detection error of the instantaneous DC voltage $V_{DCS}$ is determined based on only the variance in the resistance of the voltage-dividing resistor 51 and the voltage-dividing resistor 52 respectively. Therefore, it is possible to detect the instantaneous DC voltage $V_{DCS}$ at low cost and in high precision, by only correcting the resistance.

In the first embodiment, an example of the case of calculating the corrected target voltage $V_{ma}$ at the timing of one carrier period has been explained with reference to the flowchart shown in FIG. 5. It is also possible to calculate the corrected target voltage $V_{ma}$ at the timing of an n− (2 or above) carrier period. This case will be explained below as a second embodiment.

Next, the operation of the second embodiment will be explained with reference to a flowchart shown in FIG. 6. An example of calculating the target voltage $V_{ma}$ at the timing of a two-carrier period will be explained with reference to this drawing.

Figure 6:
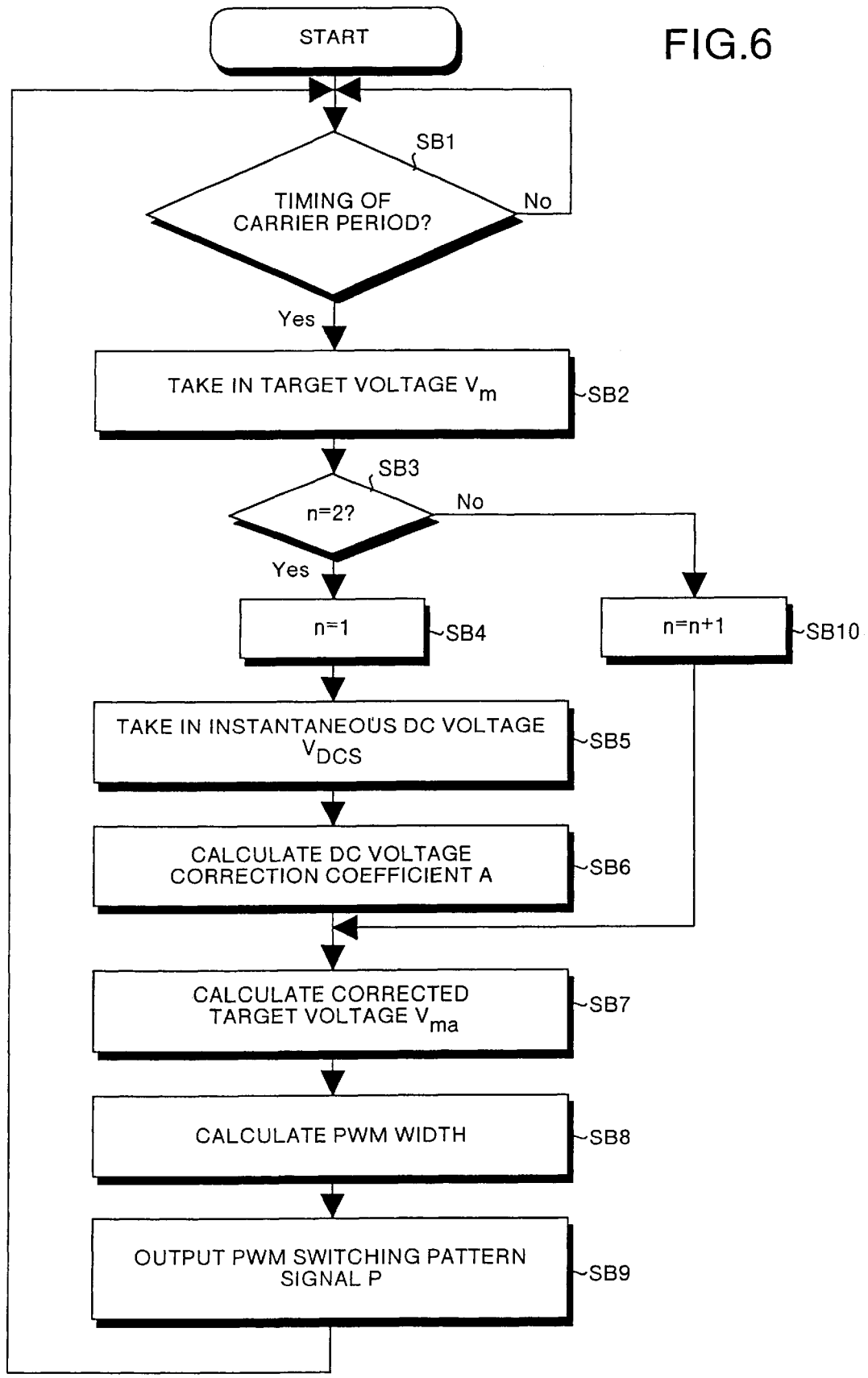
FIG. 6 is a flowchart for explaining the operation of a second embodiment.
Figure 7:
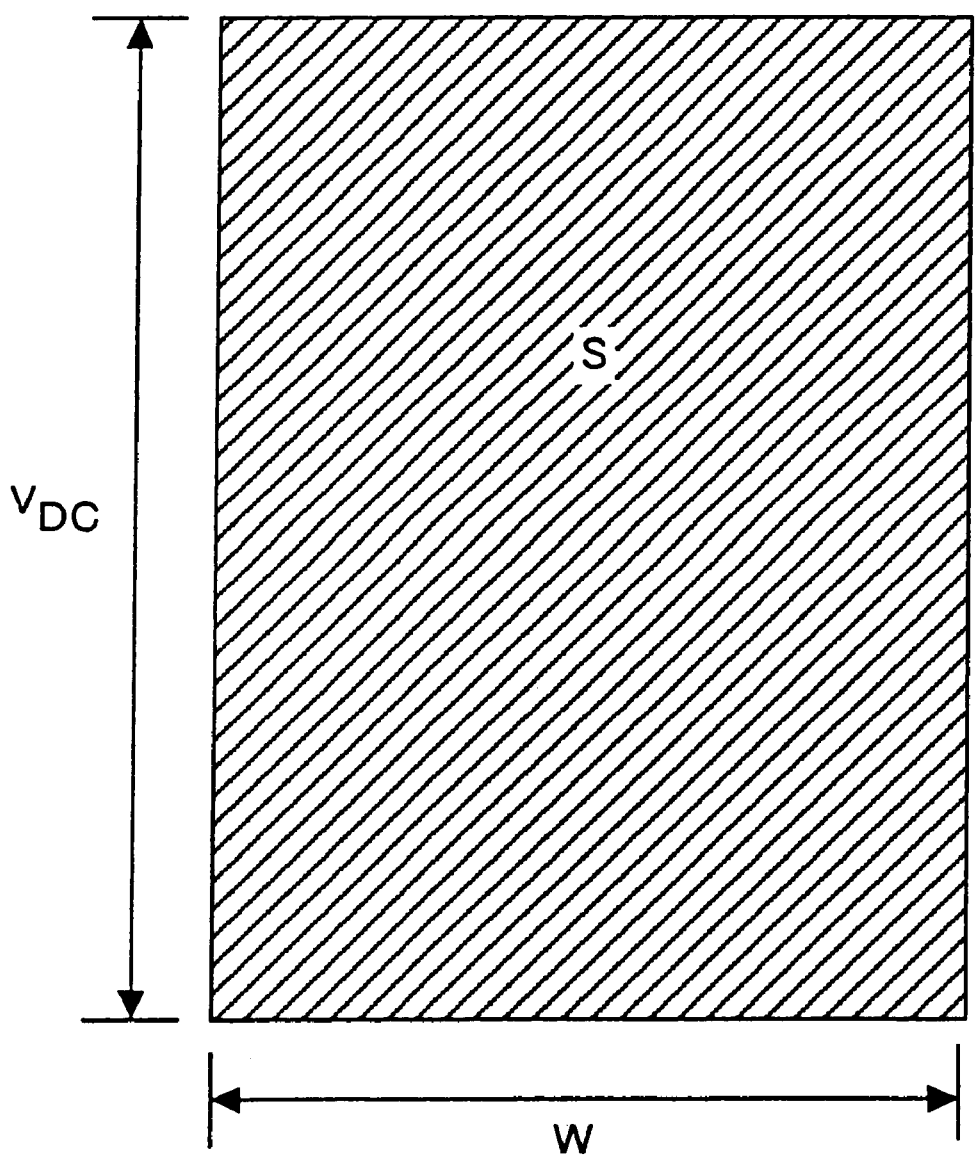
FIG. 7 is a diagram for explaining a method of determining the output AC voltage in a conventional inverter control apparatus.

First, the arithmetic processing section 100 proceeds to step SB1 shown in FIG. 6, and makes a decision as to whether the timing of a carrier period has come or not based on a result of the time measured by a timer (not shown). In this case, the arithmetic processing section 100 sets "No" as a result of the decision made, and then repeats making the same decision. When the timing of the carrier period has come, the arithmetic processing section 100 sets "Yes" as a result of the decision made at step SB1, and then proceeds to step SB2. At step SB2, the arithmetic processing section 100 takes in the target voltage $V_m$ from the target voltage output section 80 in a similar manner to that at step SA2, and then proceeds to step SB3.

At step SB3, the arithmetic processing section 100 makes a decision as to whether a carrier period count value n is 2 or not. The carrier period count value n is a count value of the carrier period. In this case, it is assumed that the carrier period count value n is 2. Then, the arithmetic processing section 100 sets "Yes" as a result of the decision made at step SB3, and then proceeds to step SB4. At step SB4, the arithmetic processing section 100 substitutes 1 into the carrier period count value n to initialize to count, and then proceeds to step SB5.

At step SB5, the arithmetic processing section 100 takes in the instantaneous DC voltage $V_{DCS}$ from the instantaneous DC voltage detecting section 50 in a similar manner to that in step SA3, and proceeds to step SB6. At step SB6, the arithmetic processing section 100 substitutes the reference voltage $V_{ref}$ from the reference voltage setting section 90 and the instantaneous DC voltage $V_{DCS}$ taken in at step SB5, into the above-described equation (1), and calculates the DC voltage correction coefficient A, in a similar manner to that at step SA4. Then, the arithmetic processing section 100 proceeds to step SB7.

At step SB7, the arithmetic processing section 100 substitutes the target voltage $V_m$ taken in at step SB2 and the DC voltage correction coefficient A calculated at step SB6, into the above-described equation (2), thereby to calculate the corrected target voltage $V_{ma}$, in a similar manner to that at step SA5, and then proceeds to step SB8.

At step SB8, the arithmetic processing section 100 divides the corrected target voltage $V_{ma}$ by the instantaneous DC voltage $V_{DCS}$ (=the DC voltage $V_{DC}$) taken in at step SB5, and obtains a PWM width, in a similar manner to that at step SA6. Then, the arithmetic processing section 100 proceeds to step SB9. At step SB9, the arithmetic processing section 100 generates the PWM switching pattern signal P corresponding to the PWM width. Next, the arithmetic processing section 100 outputs the PWM switching pattern signal P to the inverter section 60, and returns to step SB1. Then, the arithmetic processing section 100 repeats making the above decision.

When the PWM switching pattern signal P has been input to the inverter section 60, the inverter section 60 converts the DC voltage $V_{DC}$ into the output AC voltage $V_{OUT}$, by the PWM control of turning ON/OFF the switching element according to the PWM switching pattern signal P, in a similar manner to that described above. The inverter section 60 supplies this output AC voltage $V_{OUT}$ to the compressor motor 70. In this case, the output AC average voltage $VA_{OUT}$ of the output AC voltage $V_{OUT}$ takes a constant value without receiving an influence of the variation in the DC voltage $V_{DC}$ following the variation in the commercial AC voltage $V_{AC}$.

When the next timing of the carrier period has come, the arithmetic processing section 100 sets "Yes" as a result of the decision made at step SB1, and then proceeds to step SB2. At step SB2, the arithmetic processing section 100 takes in the target voltage $V_m$ from the target voltage output section 80, in a similar manner to that at step SA2, and then proceeds to step SB3.

At step SB3, the arithmetic processing section 100 makes a decision as to whether the carrier period count value n is 2 or not. In this case, as the carrier period count value n is 1, the arithmetic processing section 100 sets "Yes" as a result of the decision made at step SB3, and proceeds to step SB10. At step SB10, the arithmetic processing section 100 increments the carrier period count value n (=1) by one, and then proceeds to step SA7.

At step SB7, the arithmetic processing section 100 substitutes the target voltage $V_m$ taken in at step SB2 and the DC voltage correction coefficient A calculated at the last carrier period timing, into the above-described equation (2), thereby to calculate the corrected target voltage $V_{ma}$, in a similar manner to that at step SA5, and then proceeds to step SB8.

At step SB8, the arithmetic processing section 100 calculates a PWM width in a similar manner to that at step SA6, and then proceeds to step SB9. At step SB9, the arithmetic processing section 100 generates the PWM switching pattern signal P corresponding to the PWM width. Next, the arithmetic processing section 100 outputs the PWM switching pattern signal P to the inverter section 60, and returns to step SB1. Then, the arithmetic processing section 100 repeats making the above decision.

When the next timing of the carrier period has come, the arithmetic processing section 100 sets "Yes" as a result of the decision made at step SB1, and then proceeds to step SB2. At step SB2, the arithmetic processing section 100 takes in the target voltage $V_m$ from the target voltage output section 80, in a similar manner to that at step SA2, and then proceeds to step SB3.

At step SB3, as the carrier period count value n is 2, the arithmetic processing section 100 sets "Yes" as a result of the decision made, and then proceeds to step SB4. At step SB4, the arithmetic processing section 100 substitutes 1 into the carrier period count value n to initialize the count, and then proceeds to step SB5. At step SB5, the arithmetic processing section 100 takes in the instantaneous DC voltage $V_{DCS}$ in a similar manner to that in step SA3, and proceeds to step SB6. At step SB6, the arithmetic processing section 100 substitutes the reference voltage $V_{ref}$ from the reference voltage setting section 90 and the instantaneous DC voltage $V_{DCS}$ taken in at step SB5, into the above-described equation (1), and calculates a new DC voltage correction coefficient A, in a similar manner to that at step SA4. Then, the arithmetic processing section 100 proceeds to step SB7. In other words, the DC voltage correction coefficient A is calculated only at every two-carrier period. Thereafter, the above-described operation is repeated at step SA7 and afterwards.

As explained above, according to the second embodiment, the DC voltage correction coefficient A is calculated for every n carrier periods. Therefore, it is possible to decrease the number of calculating the DC voltage correction coefficient A per unit time, as compared with the case of calculating the DC voltage correction coefficient A for every one period like in the first embodiment. As the correction can be realized by the low-cost arithmetic processing section 100 at a slow processing speed, it is possible to lower the cost.

Particularly, when the carrier frequency is to be set high based on the request for reducing the noise of the compressor motor 70 and for improving the precision of the waveform of the output AC voltage $V_{OUT}$, the method of correcting the PWM width for every n-carrier period greatly contributes to the cost reduction.

While the first and second embodiments of the present invention have been explained in detail above with reference to the drawings, detailed structure examples are not limited to the first and second embodiments. Any other design modifications within the range not deviating from the gist of the present invention are all included in the present invention.

For example, the square-waveform PWM system as shown in FIG. 8(C) has been explained as an example in the first and second embodiments. However, it is also possible to obtain similar effects to those of the first and second embodiments when a sinusoidal wave-approximated PWM system for controlling the motor and the compressor motor is employed as the PWM system.

Further, in the first embodiment, a description has been made of the case where the reference voltage setting section 90 sets the reference voltage $V_{ref}$ (reference FIGS. 2(A) to (C)) corresponding to the commercial AC voltage $V_{AC}$. However, it is also possible to set the voltage corresponding to the power source situations of each country or region (the commercial AC voltage $V_{AC}$ is always low (or high)), as the reference voltage $V_{ref}$.

As explained above, according to the inverter control apparatus of the present invention, it is possible to supply an output AC voltage of a desired value to the AC load without receiving an influence of the variation in the commercial AC voltage. As a result, there is an effect that it is possible to operate the AC load in an optimum state of load characteristics and efficiency.

Further, the correcting unit corrects the pulse width based on a result of multiplying a ratio of a reference voltage to a detection result of the instantaneous DC voltage detecting unit, and a target voltage. Therefore, it is possible to supply an output AC voltage of a desired value to the AC load without receiving an influence of the variation in the commercial AC voltage. As a result, there is an effect that it is possible to operate the AC load in an optimum state of load characteristics and efficiency.

Further, the setting changing unit alters the setting of the reference voltage according to the commercial AC voltage. Therefore, it is possible to supply an output AC voltage of a desired value to the AC load in countries and regions where the power source situations (rated values, and stability, etc. of a commercial AC voltage,) are different. As a result, there is an effect that it is possible to operate the AC load in an optimum state regardless of countries and regions.

Further, the pulse width is corrected for every one period of a modulation carrier. Therefore, as the influence of the ripple included in the commercial AC voltage is reduced, there is an effect that it is possible to avoid a current breaking due to an overcurrent attributable to the ripple, and it is also possible to increase the reliability. Further, there is an effect that it is possible to lower the cost (an overcurrent breaking circuit) for avoiding the ripple.

Further, the ratio (a reference voltage/a detection result of the instantaneous DC voltage detecting unit) is calculated for every n periods of a modulation carrier. Therefore, it is possible to decrease the number of calculating the ratio per unit time, as compared with the case of calculating the ratio for every one period. As a result, there is an effect that it is possible to lower the cost, as the correction can be realized by a low-cost arithmetic and logic unit.

Further, there is an effect that it is possible to shorten the detection time, as compared with the case of detecting a DC voltage using an insulating circuit like a photo-coupler or the like.

Industrial Applicability

As explained above, the inverter control apparatus relating to the present invention is useful for the air conditioner that is used in countries and regions where the power source situations (rated values, and stability, etc. of a commercial AC voltage,) are different.

What is claimed is:

1. An inverter control apparatus comprising:
   a converting unit which converts a commercial AC voltage into a DC voltage;
   an inverting unit which converts the DC voltage into an output AC voltage of a predetermined frequency by a pulse-width modulation system based on an assigned pulse width, and supplies the output AC voltage to an AC load;
   an instantaneous DC voltage detecting unit which detects an instantaneous value of the DC voltage; and
   a correcting unit which corrects the pulse width so as to maintain the output AC voltage at a desired value following a variation in a result of a detection by the instantaneous DC voltage detecting unit,
   wherein the correcting unit corrects the pulse width based on a result of
   multiplying a ratio of a preset reference voltage associated with the desired value of the output AC voltage to a detection result of the instantaneous DC voltage detecting unit, and a target voltage as a target value of the output AC voltage.

2. The inverter control apparatus according to claim 1, further comprising a setting changing unit which changes a setting of the reference voltage according to the commercial AC voltage.

3. The inverter control apparatus according to claim 1, wherein the correcting unit corrects the pulse width by calculating the ratio for every one period of a modulation carrier in the pulse-width modulation system.

4. The inverter control apparatus according to claim 1, wherein the correcting unit corrects the pulse width by calculating the ratio for every n periods of a modulation carrier in the pulse-width modulation system, wherein n is equal to or greater than 2.

5. The inverter control apparatus according to claim 1, wherein the desired value is a rated value of the output AC voltage.

6. An inverter control apparatus comprising:
   a converting unit which converts a commercial AC voltage into a DC voltage;
   an inverting unit which converts the DC voltage into an output AC voltage of a predetermined frequency by a pulse-width modulation system based on an assigned pulse width, and supplies the output AC voltage to an AC load;
   an instantaneous DC voltage detecting unit which detects an instantaneous value of the DC voltage; and
   a correcting unit which corrects the pulse width so as to maintain the output AC voltage at a desired value following a variation in a result of a detection by the instantaneous DC voltage detecting unit, wherein the correcting unit corrects the pulse width so that a surface area calculated as a product between the pulse width and the DC voltage remains at a constant value.

* * * * *